US006290919B1

(12) United States Patent
Yokoyama et al.

(10) Patent No.: US 6,290,919 B1
(45) Date of Patent: Sep. 18, 2001

(54) ELECTROSTATIC SEPARATING APPARATUS

(75) Inventors: Sadahiko Yokoyama; Masao Shimoda; Masatoshi Iji; Tokukazu Kiji, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/533,775

(22) Filed: Mar. 24, 2000

(30) Foreign Application Priority Data

Mar. 25, 1999 (JP) ........................................ 11-081238

(51) Int. Cl.[7] ........................................ B01J 19/08
(52) U.S. Cl. ........................................ 422/186.04
(58) Field of Search ..................... 422/186.04, 186.05; 209/128

(56) References Cited

U.S. PATENT DOCUMENTS 3,581,468 * 6/1971 Gourdine ................................ 96/40
3,653,185 * 4/1972 Scott et al. ................................ 96/16
4,374,727 * 2/1983 Takahashi et al. .................. 72/389.4
5,704,490 * 1/1998 Reynard ................................ 209/128

* cited by examiner

*Primary Examiner*—Kathryn Gorgos
*Assistant Examiner*—Thao Tran
(74) *Attorney, Agent, or Firm*—Foley & Lardner

(57) ABSTRACT

In an electrostatic separating apparatus which separates supplied substances containing sheet-like substances into conductive substances and insulating substances by using electrostatic force and corona discharge together, a ground electrode unit has a carrier belt tensioned for a plurality of rotation rollers. An opposite electrode unit is provided with a first electrostatic electrode, a corona electrode, and a second electrostatic electrode in this order from a supply side of the supplied substances. A removing unit separates and removes the insulating substances attached to the ground electrode unit.

17 Claims, 1 Drawing Sheet

ELECTROSTATIC SEPARATING APPARATUS

BACKGROUND OF THE INVENTION

This invention mainly relates to an electrostatic separating apparatus which separates supplied substances containing sheet-like substances into conductive substances (conductors) and insulating substances (insulators) by using electrostatic force (namely, Coulomb's force) and corona discharge together.

Conventionally, disclosure has been made about this kind of electrostatic separating apparatus in a paper (Owada, Electric Selection, "Source and Material": Vol. 113, No. 12, pp. 920–923, 1997).

Such an electrostatic separating apparatus separates supplied substances (namely, substances to be separated) into conductive substances and insulating substances using electrostatic force and corona discharge together.

This electrostatic separating apparatus is basically provided with a roller type ground electrode and an opposite electrode having a corona electrode and an electrostatic charge electrode from a supply side of the substance, and further has a brush for removing the insulating substances attached to the ground electrode.

Meanwhile, another disclosure has been made about an electrostatic separating apparatus in which a steel belt conveyor is used as the ground electrode in Japanese Unexamined Patent Publication (JP-A) No. S50-60866.

In the above-mentioned electrostatic separating apparatus, the supplied substances are separated into the insulating substances and the conductive substances by using the electrostatic force and the corona discharge together.

Under this circumstance, separating efficiency is excessively reduced when the sheet-like substances are contained in the supplied substances.

More specifically, when the separation is carried out by the use of the electrostatic force and the corona discharge, the insulating substances are attached to the ground electrode by the electrostatic force in electrostatic field generated between the ground electrode and the opposite electrode.

In the meantime, the conductive substances are not attached to the ground electrode, and thereby, are separated from the insulating substances. This is because the conductive substances have the same potential as the ground electrode by contacting with the ground electrode.

In consequence, the supplied substances must be contacted with the ground electrode in the electrostatic field to perform the electrostatic separation.

Under such a circumstance, when the sheet-like substances are contained in the supplied substances, the sheet-like substances prevent the conductive substances from contacting with the ground electrode. Consequently, the separating efficiency is remarkably reduced.

In addition, when the sheet-like substances contain a plurality of insulating substances, the sheet-like substances are strongly attached to a surface of the ground electrode because a surface area thereof is large. As a result, the sheet-like substances can not be removed by the brush provided in the conventional electrostatic separating apparatus.

When the sheet-like substances are left or remained on the condition that the substances are attached to the ground electrode, they are prevented the conductive substances in successively supplied substances from contacting with the ground electrode. Further, attaching force for the insulating substances is weakened. In consequence, the separating efficiency is remarkably reduced.

Thus, it is difficult to electrostatically separate the supplied substances containing the sheet-like substances in the conventional electrostatic separating apparatus.

SUMMARY OF THE INVENTION

It is therefore an object of this invention to provide an electrostatic separating apparatus which is capable of efficiently separating supplied substances into conductive substances and insulating substances even when the supplied substances contains sheet-like substances.

An electrostatic separating apparatus according to this invention separates supplied substances containing sheet-like substances into conductive substances and insulating substances by using electrostatic force and corona discharge together.

With such a structure, the electrostatic separating apparatus comprises a ground electrode unit, an opposite electrode unit, and a removing unit.

In this case, the ground electrode unit has a carrier belt tensioned for a plurality of rotation rollers. Further, the opposite electrode unit is provided with a first electrostatic electrode, a corona electrode, and a second electrostatic electrode in this order from a supply side of the supplied substances. Moreover, the removing unit separates and removes the insulating substances attached to the ground electrode unit.

The rotation rollers comprise a pair of first and second rotation rollers. In this event, the first rotation roller is positioned at the supply side. The first rotation roller has a first radius while the second rotation roller has a second radius.

The first radius may be substantially equal to the second radius. Alternatively, the first radius may be smaller than the second radius.

Herein, it is to be noted that the carrier belt is conductive. Further, the carrier belt may be formed to a mesh shape.

Further, the removing unit is preferably arranged inside the carrier belt. The removing unit comprises an air flow spraying mechanism which sprays an air flow for the insulating substances attached to the ground electrode unit.

Alternatively, the removing unit may comprise an ion generating mechanism which generates at least one of positive ions and negative ions.

Instead, the removing unit may comprise an alternating electric field generating mechanism which generates decaying alternating electric field or an air suction mechanism which sucks air.

DESCRIPTION OF PREFERRED EMBODIMENTS

First Embodiment

Figure 1:
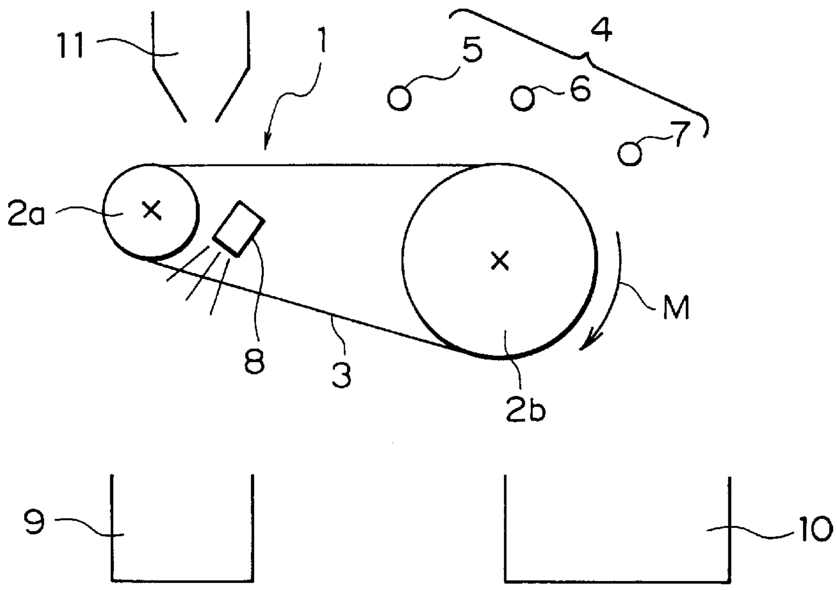
FIG. 1 is a side view showing an electrostatic separating apparatus according to a first embodiment of this invention.

Referring to FIG. 1, description will be made about a first embodiment of this invention.

The illustrated electrostatic separating apparatus separates supplied substances (namely, substances to be separated) into conductive substances and insulating substances by using electrostatic force and corona discharge together.

The electrostatic separating apparatus includes a ground electrode unit 1, an opposite electrode unit 4, and a removing unit 8. In this case, the ground electrode unit 1 is composed of a pair of rotation rollers 2*a* and 2*b* tensioned by a carrier belt.

The opposite electrode unit 4 is composed of a first electrostatic electrode 5, a corona electrode 6, and a second electrostatic electrode 7 in this order (or sequence) from a supply side of the substances to be separated. The removing unit 8 separates and removes the insulating substances attached to the ground electrode unit 1.

With this structure, an insulating substance recovering container 9 is arranged under the rotation roller 2*a* while a conductive substance recovering container 10 is placed under the rotation roller 2*b*. Herein, it is to be noted that a radius of the rotation roller 2*a* is smaller than a radius of the rotation roller 2*b*.

In this event, the rotation roller 2*b* rotates in a direction indicated by M, as illustrated in FIG. 1. Further, the carrier belt 3 is formed to a mesh shape, and is conductive. The removing unit 8 is arranged inside the carrier belt 3.

For example, the rotation roller 2*a* has a radius of 75 mm and a length of 300 mm while the rotation roller 2*b* has a radius of 150 mm and a length of 300 mm. A distance between rotation axes of the rotation rollers 2*a* and 2*b* is equal to 500 mm, and a rotation number of each rotation roller 2*a* and 2*b* is equal to 50 rpm.

For instance, the conductive carrier belt 3 of the mesh shape has a mesh size of 5 mm, and is made by a normal stainless steel. In the opposite electrode unit 4, each of the first electrostatic electrode 5 and the second electrostatic electrode 7 is formed to a bar shape, and is made by the stainless steel. The corona electrode 6 is made by the stainless steel, and is formed to a wire shape having a diameter of 1 mm.

For example, the removing unit 8 is provided with an air flow spraying mechanism which sprays an air flow to the insulating substances attached to the ground electrode unit 1, and an ion generating unit which generates positive ions by the corona discharge. In this case, the air flow spraying mechanism utilizes compression air while the ion generating mechanism utilizes an ionizer which is commercially used to remove electric charge.

The removing unit 8 may include an ion generating mechanism which generates negative ions or an ion generating mechanism which generates positive ions and negative ions, instead of the ion generating mechanism which generates the positive ions.

Alternatively, the removing unit 8 may selectively include an alternating electric field generating mechanism which generates decaying alternating electric field and an air suction mechanism which sucks air. With this structure, a voltage between the ground electrode unit 1 and the opposite electrode unit 4 is preferably set to 20 kV.

In the above-mentioned electrostatic separating apparatus, the ground electrode unit 1 is driven, and the carrier belt 3 tensioned for the respective rotation rollers 2*a* and 2*b* is traveled towards the opposite electrode unit 4 in accordance with the rotation direction M.

In this state, when the substances are supplied from a hopper 11 into the ground electrode unit 1, the supplied substances sequentially pass in electric field formed by the first electrostatic electrode 5, the corona electrode 6, and the second electrostatic electrode 7 in the opposite electrode unit 4.

In this event, the insulating substances in the supplied substances are attached to the carrier belt 3, and are removed by the removing unit 8. Thereby, the removed insulating substances fall downward near one end side, and are recovered in the insulating substance recovering container 9.

On the other hand, the conductive substances in the supplied substance are not attached by the carrier belt 3, and fall downward near the other end side by the gravity, and are recovered in the conductive substance recovering container 10.

In this case, when a kind or more of sheet-like substances are contained in the supplied substances, a lengthwise of the sheet-like substance in the supplied substance is mainly orientated from the ground electrode unit 1 towards the first electrostatic electrode 5 by the electrostatic field formed between the first electrostatic electrode 5 in the opposite electrode unit 4 and the ground electrode unit 1.

Consequently, the other component substances, which are contained in the supplied substance and are prevented from contacting with the ground electrode unit 1 by the sheet-like substances, are not disturbed by the sheet-like substances, and efficiently contact with the ground electrode unit 1.

Subsequently, the insulating substances in the supplied substances strongly proceed in polarization by an effect of the negative ions of the corona discharge generated by the corona electrode 6, and are attached to the ground electrode unit 1.

On the other hand, the conductive substances in the supplied substances have the same electric potential with the ground electrode unit 1 because the conductive substances contact with the ground electrode unit 1.

Consequently, the conductive substances are attracted towards the second electrostatic electrode 7. The conductive substances are not attached to the ground electrode unit 1, fall by the gravity, and are recovered in the conductive substance recovering container 10.

Further, the insulating substances attached to the ground electrode unit 1 are precisely removed by the use of removing function (such as, ions, air flow, electric charge removing effect of alternating electric field, suction) of the removing unit 8, and are recovered in the insulating substance recovering container 9.

Herein, the reason for forming the carrier belt 3 into the mesh shape is explained as follows. Namely, strong suction force, which is generated between the surface of the sheet-like substance and the carrier belt 3, is effectively relieved at an insulating portion due to the mesh. Thereby, the sheet-like substances can be readily peeled from the ground electrode unit 1 in the removing unit 8.

In such an electrostatic separating apparatus, the carrier belt 3 of the ground electrode unit 1 is formed by a conductive material, such as, a mesh-like metal. Thereby, the suction force of the sheet-like belt 3 for the carrier belt 3 is suppressed to a relatively low value, and the sheet-like substances can readily be removed by the removing unit 8.

Further, the removing unit 8 has the air flow spraying mechanism for spraying the air flow, the ion generating mechanism for generating at least one of the positive ions and the negative ions, the alternating electric field generating mechanism for generating the decaying alternating electric filed, and the air suction mechanism for sucking the air.

In consequence, the insulating substances attached by the electrostatic force can be easily removed from the ground electrode unit 1.

Moreover, the removing unit 8 is arranged inside the carrier belt 3. Consequently, the attached substances are further effectively removed. Therefore, the supplied substances can be efficiently and precisely separated into the conductive substances and the insulating substances to recover them even when the supplied substances contain the sheet-like substances.

In the above-mentioned electrostatic separating apparatus, although each of the first electrostatic electrode 5 and the second electrostatic electrode 7 has the bar shape in the opposite electrode unit 4, the other shape, such as, a wire shape and an elliptic shape can be applied thereto.

Similarly, although the corona electrode 6 in the opposite electrode unit 4 has the wire shape, the other shape, such as, a needle shape, can be applied thereto.

Further, although the ground electrode unit 1 is structured by tensioning the carrier belt 3 for the two rotation rollers 2, the carrier belt 3 may be tensioned for three or more of rotation rollers 2.

Moreover, each of the rotation rollers 2 may have the same radius to each other when the two rotation rollers 2 are provided as illustrated in FIG. 1 or when three or more of rotation rollers are arranged.

Second Embodiment

Figure 2:
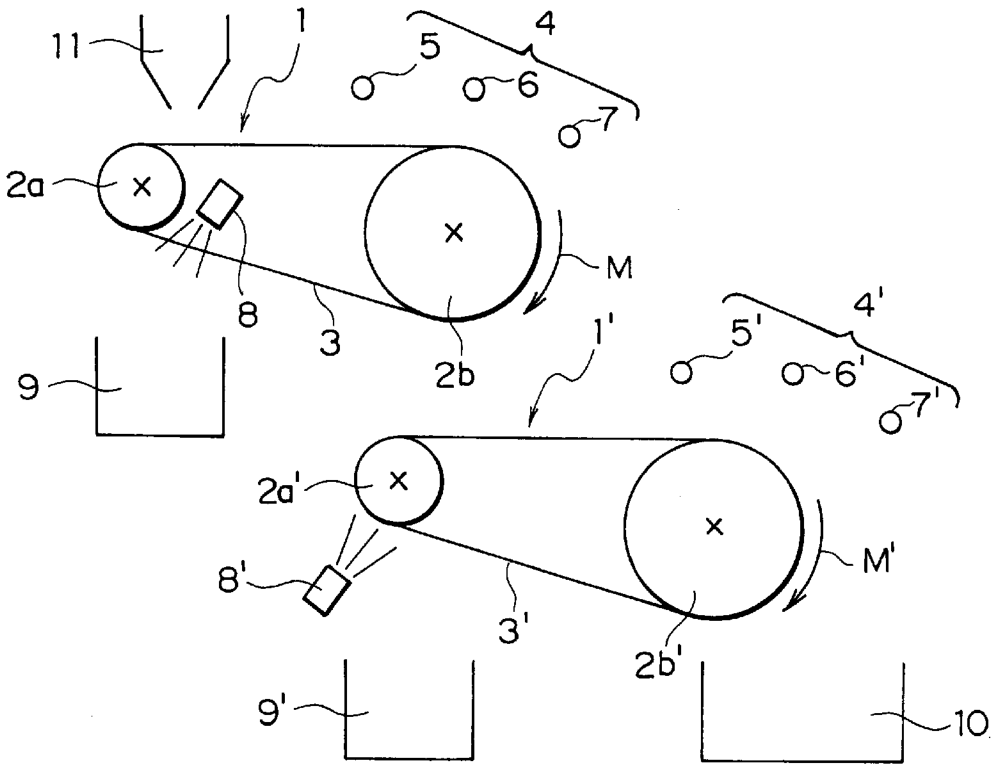
FIG. 2 is a side view showing an electrostatic separating apparatus according to a second embodiment of this invention

Referring to FIG. 2, description will be made about a second embodiment of this invention.

The illustrated electrostatic separating apparatus has double stages of electrostatic separating units, namely, a first electrostatic separating unit and a second electrostatic separating unit.

In this case, the second electrostatic separating unit is arranged under the first electrostatic separating unit, as illustrated in FIG. 2. The first electrostatic separating unit has a similar structure with the second separating unit The first electrostatic separating unit includes a ground electrode unit 1, an opposite electrode unit 4, and a removing unit 8. In this event, the ground electrode unit 1 is composed of a pair of rotation rollers 2*a* and 2*b* tensioned by a carrier belt 3.

The opposite electrode unit 4 is composed of a first electrostatic electrode 5, a corona electrode 6, and a second electrostatic electrode 7 in this order (sequence) from a supply side of substances to be separated. The removing unit 8 separates and removes insulating substances attached to the ground electrode unit 1.

The second electrostatic separating unit includes a ground electrode unit 1', an opposite electrode unit 4', and a removing unit 8'. In this case, the ground electrode unit 1' is composed of a pair of rotation rollers 2*a*' and 2*b*' tensioned by a carrier belt 3'.

The opposite electrode unit 4' is composed of a first electrostatic electrode 5', a corona electrode 6', and a second electrostatic electrode 7' in this order from a supply side of the substances to be separated. The removing units 8' separates and removes the insulating substances attached to the ground electrode unit 1'.

With such a structure, the removing unit 8 is arranged inside the carrier belt 8 of the first electrostatic separating unit while the removing unit 8' is arranged outside the carrier belt 3' of the second electrostatic separating unit.

In this case, the carrier belt 3 is conductive, and is formed to a mesh shape in the ground electrode unit 1 of the first electrostatic separating unit while the carrier belt 3' is conductive, and is formed to a non-mesh shape in the ground electrode unit 1' of the second electrostatic separating unit.

Further, an insulating substance recovering container 9 is arranged under the rotation roller 2*a* in the first electrostatic separating unit. Another insulating substance recovering container 9' is arraigned under the rotation roller 2*a*' in the second electrostatic separating unit while a conductive substance recovering container 10 is arranged under the rotation roller 2*b*' in the second electrostatic separating unit.

Herein, it is to be noted that a radius of the rotation roller 2*a* and 2*a*' is smaller than a radius of the rotation roller 2*b* and 2*b*'. In this event, the rotation roller 2*b* rotates in a direction indicated by M while the rotation roller 2*b*' rotates in a direction indicated by M'.

With this structure, each of the ground electrode units 1 and 1' are driven, and each of the carrier belts 3 and 3' tensioned to the rotation rollers 2 and 2' is traveled towards each of the opposite electrode units 4 and 4' in accordance the rotation directions M and M'.

Under this circumstance, the substances to be separated are supplied onto the ground electrode unit 1 from a hopper 11. In this condition, the insulating substances and the conductive substances, which are not recovered in the first electrostatic separating unit, are supplied to the second electrostatic separating unit.

The insulating substances are attached to the carrier belt 3', are removed by the removing unit 8', and are recovered in the insulating substance recovering container 9'. Further, the conductive substances are recovered in the conductive substance recovering container 10.

Herein, specification of the first and second electrostatic separating units will be explained as follows. Namely, each radius of the rotation rollers 2*a,* 2*b* and the rotation rollers 2*a*', 2*b*' in the ground electrode unit 1 and the ground electrode unit 1' is preferably selected within the range between 15 mm and 500 mm.

Further, the length is preferably selected within the range between 100 mm and 300 mm. The rotation number is preferably selected within the range between 10 rpm and 300 rpm. Moreover, the distances between the respective rotation axes of the rotation rollers 2*a,* 2*b* and the rotation rollers 2*a*', 2*b*' are selected within the range between 100 mm and 100 mm. The mesh size of the conductive carrier belt 3 of the mesh shape is preferably selected within the range 1 mm and 100 mm.

If the material of the carrier belt 3 and the carrier belt 3' is a conductor, no problem occurs. In this event, a material having high conductivity is desirable.

Further, each number of the rotation rollers 2 and the rotation rollers 2' may be three or more. In this event, it is possible to further increase the number in such a range that the carrier belts 3 and 3' can smoothly travel.

Moreover, each shape of the first electrostatic electrodes 5, 5' and the second electrostatic electrodes 7, 7' may be selected from the group consisting of the bar shape, the wire shape, and the elliptic shape. Each shape of the corona electrodes 6, 6' may be the wire shape or the needle shape.

In particular, when each shape of the first electrostatic electrodes 5, 5' is selected to the bar shape, each shape of the second electrostatic electrodes 7, 7' is preferably selected to the elliptic shape, and each shape of the corona electrodes 6, 6' is preferably selected to the needle shape.

In addition, the first electrostatic electrodes 5, 5', the corona electrodes 6, 6', and the second electrostatic electrodes 7, 7' may be structured by combining a plurality of electrodes, respectively. In this event, the shapes of the combined electrodes are not always equal to each other, and a bar shape electrode and an elliptic electrode may be, for example, combined to each other.

The removing units 8, 8' can remove the insulating substances attached to the carrier belt 3 or the carrier belt 3'. Each removing unit 8, 8' selectively and preferably includes an air flow spraying mechanism which sprays the air flow, an ion generating mechanism which generates at least one of positive ions and negative ions, an alternating electric field generating mechanism which generates decaying alternating electric field, and an air suction mechanism which sucks air.

In this case, the removing unit 8 is preferably arranged in a rear side of the carrier belt 3 for the conductive carrier belt 3 of the mesh shape. In the meantime, the removing unit 8' is preferably arranged in a surface side of the carrier belt 3' for the conductive carrier belt 3' of the non-mesh shape.

In such a double stages of electrostatic separating apparatus illustrated in FIG. 2, even when one or more kinds of sheet-like substances contained in the supplied substances include many insulating substances, almost of the sheet-like substances (namely, insulating substances) are recovered in the first electrostatic separating unit.

The insulating substances except for the sheet-like substances are supplied onto the conductive carrier belt 3' of the non-mesh in the ground electrode unit 1' of the second electrostatic separating unit, and are effectively recovered. In consequence, the separating efficiency can be further improved.

More specifically, the same operation as the first embodiment is carried out in the first electrostatic separating unit of the first stage in the second embodiment.

The insulating substances and the conductive substances, which are not separated in the first electrostatic separating unit, are mixed and supplied into the second electrostatic separating unit. Under this circumstance, almost of the sheet-like substances (the insulating substances) are removed in the first electrostatic separating unit. Consequently, the insulating substances supplied into the second electrostatic separating unit contain a slight of sheet-like substances and the non-sheet-like substances.

In this case, high electrostatic force is required in comparison with the sheet-like substances so as to attach the non-sheet-like substances of the insulating substances to the ground electrode unit 1'. The conductive carrier belt 3' of the non-mesh shape satisfies such a condition. As a result, the insulating substances are efficiently recovered.

Although the electrostatic separating apparatus according to the second embodiment is structured by the double stage of the first and second electrostatic separating units, it may be structured by three or more stages.

With this structure, the ground electrode unit 1 in the first electrostatic separating unit is preferably provided with the conductive carrier belt 3 of the mesh shape. The ground electrode unit 1' in the second electrostatic separating unit is preferably provided with the conductive carrier belt 3' of the non-mesh shape.

Further, the removing unit 8 is arranged inside the carrier belt 3 of the first electrostatic separating unit while the removing unit 8' is arranged outside the carrier belt 8' of the second electrostatic separating unit.

Moreover, the insulating substance recovering container 9 is preferably arranged under the rotation roller **2*a* in the first electrostatic separating unit. Another insulating substance recovering container 9' is preferably arranged under the rotation roller 2*a*' in the final electrostatic separating unit while the conductive substance recovering container 10 is preferably arranged under the rotation roller 2*b*'** in the final electrostatic separating unit.

Meanwhile, the ground electrode unit 1 has positive polarity (+) while the opposite electrode unit 4 has negative polarity (–). Alternatively, the ground electrode unit 1 may have negative polarity (–) while the opposite electrode unit 4 may have positive polarity (+).

As mentioned above, the electrostatic separating apparatus according to this invention basically includes the ground electrode unit, the opposite electrode unit, and the removing unit.

In this case, the carrier belt is tensioned for a plurality of rotation rollers in the ground electrode unit. In the opposite electrode unit, the first electrostatic electrode, the corona electrode and the second electrostatic electrode are arranged in this order from the supply side of the substances to be separated. The removing unit separates and removes the insulating substances attached to the ground electrode unit.

Alternatively, the electrostatic separating unit having these portions may be structured by a plurality of stages. With such a structure, the conductive material of the mesh shape or the non-mesh shape may be suitably applied.

Further, the removing unit may includes either one of the air flow spray mechanism for spraying the air flow, the ion generating mechanism for generating at least one of the positive ions and the negative ions, the alternating electric field generating mechanism for generating the decaying alternating electric field, and the air suction mechanism which sucks air.

With this structure, the insulating substances attached to the ground electrode unit are readily and precisely removed by the use of the carrier belt.

In consequence, even when the supplied substances contain the sheet-like substances, the supplied substances can be efficiently separated into the conductive substances and the insulating substances.

As a result, the conductive substances and the insulating substances can be efficiently recovered from the supplied substances containing the sheet-like substances.

In particular, commercial substances can be efficiently separated from the supplied substances mixed with substances having a variety of shapes, such as, wastes.

Thereby, a recycle process can be properly carried out, and further, the wastes can be efficiently processed. Thus, the electrostatic separating apparatus according to this invention is excessively and industrially useful.

What is claimed is:

1. An electrostatic separating apparatus which separates supplied substances containing sheet-shaped substances into conductive substances and insulating substances by using electrostatic force and corona discharge together, comprising:

a ground electrode unit which has a carrier belt tensioned by a plurality of rotation rollers;

an opposite electrode unit which is provided with a first electrostatic electrode, a corona electrode, and a second electrostatic electrode in this order from a supply side of the supplied substances; and a removing unit which separates and removes the insulating substances attached to the ground electrode unit.

2. An apparatus as claimed in claim 1, wherein:

the rotation rollers comprises a pair of first and second rotation rollers, the first rotation roller is positioned at the supply side, and the first rotation roller has a first radius while the second rotation roller has a second radius.

3. An apparatus as claimed in claim 2, wherein:

the first radius is substantially equal to the second radius.

4. An apparatus as claimed in claim 2, wherein:

the first radius is smaller than the second radius.

5. An apparatus as claimed in claim 1, wherein:

the carrier belt is conductive.

6. An apparatus as claimed in claim 1, wherein:

the carrier belt is formed to a mesh shape.

7. An apparatus as claimed in claim 1, wherein:

the removing unit is arranged inside the carrier belt.

8. An apparatus as claimed in claim 1, wherein:

the removing unit comprises an air flow spraying mechanism which sprays an air flow for the insulating substances attached to the ground electrode unit.

9. An apparatus as claimed in claim 1, wherein:

the removing unit comprises an ion generating mechanism which generates at least one of positive ions and negative ions.

10. An apparatus as claimed in claim 1, wherein:

the removing unit comprises an alternating electric field generating mechanism which generates decaying alternating electric field.

11. An apparatus as claimed in claim 1, wherein:

the removing unit comprises an air suction mechanism which sucks air.

12. An apparatus as claimed in claim 1, wherein:

the ground electrode unit, the opposite electrode unit, and the removing unit constitutes an electrostatic separating unit, and the apparatus is structured by providing the electrostatic separating unit with a plurality of stages.

13. An apparatus as claimed in claim 12, wherein:

the carrier belt of the ground electrode unit is conductive, and is formed to a mesh shape in the electrostatic separating unit of a first stage.

14. An apparatus as claimed in claim 13, wherein:

the carrier belt of the ground electrode unit is conductive and is formed to a non-mesh shape in the electrostatic separating unit of a second stage and later.

15. An apparatus as claimed in claim 1, wherein the supplied substances contain at least one kind or more of the sheet-shaped substances.

16. An apparatus as claimed in claim 1, wherein:

each of the first electrostatic electrode and the second electrostatic electrode is formed to either one of a bar shape, a wire shape, and an elliptic shape.

17. An apparatus as claimed in claim 1, wherein:

the corona electrode is formed to a wire shape or a needle shape.

* * * * *